United States Patent
Pekar et al.

(10) Patent No.: US 10,142,439 B2
(45) Date of Patent: Nov. 27, 2018

(54) GENERATION OF APPLICATION CONTROL BLOCKS FOR AN IMS DATABASE USING A CACHE MEMORY

(71) Applicant: CA, Inc., New York, NY (US)

(72) Inventors: Miloslav Pekar, Prague (CZ); Gabriel Bartal, Nána (SK); Vaclav Koudelka, Prague (CZ); Jiří Vandas, Prague (CZ)

(73) Assignee: CA, Inc., New York, NY (US)

( * ) Notice: Subject to any disclaimer, the term of this patent is extended or adjusted under 35 U.S.C. 154(b) by 232 days.

(21) Appl. No.: 15/072,986

(22) Filed: Mar. 17, 2016

(65) Prior Publication Data

US 2017/0272533 A1    Sep. 21, 2017

(51) Int. Cl.
*G06F 15/16* (2006.01)
*H04L 29/08* (2006.01)
*G06F 17/30* (2006.01)

(52) U.S. Cl.
CPC .... *H04L 67/2852* (2013.01); *G06F 17/30457* (2013.01); *H04L 67/2857* (2013.01)

(58) Field of Classification Search
CPC .......................... H04L 67/2852; H04L 67/42
See application file for complete search history.

(56) References Cited

U.S. PATENT DOCUMENTS

| | | | | |
|---|---|---|---|---|
| 2003/0088572 A1* | 5/2003 | Smith | ............... | G06F 17/30589 |
| 2003/0163511 A1* | 8/2003 | Smith | ............... | G06F 9/4843 |
| | | | | 718/101 |
| 2003/0204510 A1* | 10/2003 | Ball | .............. | G06F 17/30286 |
| 2007/0255810 A1* | 11/2007 | Shuster | ............ | G06F 17/30864 |
| | | | | 709/219 |
| 2014/0041026 A1* | 2/2014 | Scott | ....................... | G06F 21/53 |
| | | | | 726/22 |
| 2014/0258335 A1* | 9/2014 | Mansur | ..................... | G06F 9/44 |
| | | | | 707/782 |

OTHER PUBLICATIONS

IBM Knowledge Center, "Advanced Application Control Block Generator Utility", IMS Library Integrity Utilities for z/OS 2.2.0, www.ibm.com ; accessed Mar. 17, 2016, 13 pages.

* cited by examiner

*Primary Examiner* — Hua Fan
(74) *Attorney, Agent, or Firm* — Sage Patent Group

(57) ABSTRACT

A method includes performing, by a processor of a database server: intercepting an operating system supervisor call involving a request for information associated with an information Management System (IMS) database from a secondary storage device, the IMS database being embodied in the secondary storage device; determining whether the information that was requested is stored in a cache memory embodied in a primary storage device; retrieving the information that was requested responsive to determining that the information that was requested is stored in the cache memory; executing the operating system supervisor call to perform a read of the secondary storage device to obtain the information that was requested responsive to determining that the information that was requested is not stored in the cache memory; and storing the information that was requested in the cache memory responsive to executing the operating system supervisor call to obtain the information that was requested.

11 Claims, 7 Drawing Sheets

GENERATION OF APPLICATION CONTROL BLOCKS FOR AN IMS DATABASE USING A CACHE MEMORY

BACKGROUND

The present disclosure relates to computer systems, and, in particular, to methods, systems, and computer program products for managing computer system databases.

Information Management System (IMS) is a database system that is used with IBM computer systems. IMS comprises a hierarchical database and an online transaction processing systems. Database types may include relational and hierarchical. Relational databases comprise tables that relate to other tables based on specific columns. Examples of relational databases include DB2, Oracle, MySQL, and PostgreSQL. IMS is an example of a hierarchical database. An IMS database is made up of segments that are arranged in a hierarchical order similar to, for example, the arrangement of information in an XML file.

In an IMS database, the topmost segment is called the root segment with information relevant to the root segment being stored in child segments. For example, a business that employs multiple sales persons may create an IMS database to store information about the sales team. The top most segment in the IMS database may include information about each sales person including name, address, phone number, email address, etc. A second level of segments may be defined for the various clients that the sales person serves. A third level of segments may be defined for each client that lists the transactions, e.g., sales, returns, orders, etc. associated with that client. Thus, the transaction segments are children segments of the client segments, which are children of the sales personnel segments.

IMS uses a set of constructs known as a database definition (DBD), a program specification block (PSB), and an access control block (ACB) to allow application programs to use a database.

In relational databases, tables are created using SQL statements. IMS uses a DBD to define the type of database, all segments and fields, and any logical relationships or indexing. A database administrator codes a set of assembler macros that are processed by a DBDGEN utility to generate a DBD control block. The DBD control block is then stored in a DBD library. IMS uses the DBD control block to determine the physical structure of the database.

In relational databases, views can be restricted to columns within tables by creating logical views. IMS uses a PSB to create logical views within a database. The PSB specifies all databases that an application can access, which segments in the database(s) that the application program is sensitive to, and how the application program can use the segments, e.g., inquiry or update. Similar to a DBD, a database administrator codes a set of assembler macros that are processed by a PSBGEN utility to generate a PSB control block. The PSB control block is then stored in a PSB library. A PSB may contain one or more program control blocks (PCBs). A PCB is defined for each database accessed by an application program and specifies the segments to which the application program can have access and the processing authorization for each segment.

FIG. 1 illustrates the logical relationship between an application program and an IMS database. As shown in FIG. 1, the application program 105 specifies the PSB 110, which is used to access two databases through PCB1 115a and PCB2 115a. The two DBDs-DBD1 120a and DBD2 120b—are used to define databases DB1 125a and DB2 125b, respectively. Application control blocks (ACBs) are created by merging information from PSBs and DBDs. The application program 105 uses the ACBs during execution. For online applications, ACBs are prebuilt using the ACB maintenance utility ACBGEN. For batch applications, it is not required that the ACBs be prebuilt, but it may nevertheless be desirable to prebuild the ACBs as prebuilt ACBs require less time to schedule an application program and use less storage.

SUMMARY

In some embodiments of the inventive subject matter, a method comprises performing, by a processor of a database server: intercepting an operating system supervisor call involving a request for information associated with an Information Management System (IMS) database from a secondary storage device, the IMS database being embodied in the secondary storage device; determining whether the information that was requested is stored in a cache memory embodied in a primary storage device; retrieving the information that was requested responsive to determining that the information that was requested is stored in the cache memory; executing the operating system supervisor call to perform a read of the secondary storage device to obtain the information that was requested responsive to determining that the information that was requested is not stored in the cache memory; and storing the information that was requested in the cache memory responsive to executing the operating system supervisor call to obtain the information that was requested.

In other embodiments of the inventive subject matter, a system comprises a processor of a database server and a memory coupled to the processor and comprising computer readable program code embodied in the memory that is executable by the processor to perform: intercepting a z/OS operating system LOAD supervisor call involving a request for information associated with an information Management System (IMS) database from a secondary storage device, the IMS database being embodied in the secondary storage device; determining whether the information that was requested is stored in a cache memory embodied in a primary storage device; and retrieving the information that was requested responsive to determining that the information that was requested is stored in the cache memory.

In further embodiments of the inventive subject matter, a computer program product comprises a tangible computer readable storage medium comprising computer readable program code embodied in the medium that is executable by a processor of a database server to perform: intercepting a z/OS operating system BLDL supervisor call involving a request for information associated with an information Management System (IMS) database from a secondary storage device, the IMS database being embodied in the secondary storage device; determining whether the information that was requested is stored in a cache memory embodied in a primary storage device; and retrieving the information that was requested responsive to determining that the information that was requested is stored in the cache memory.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
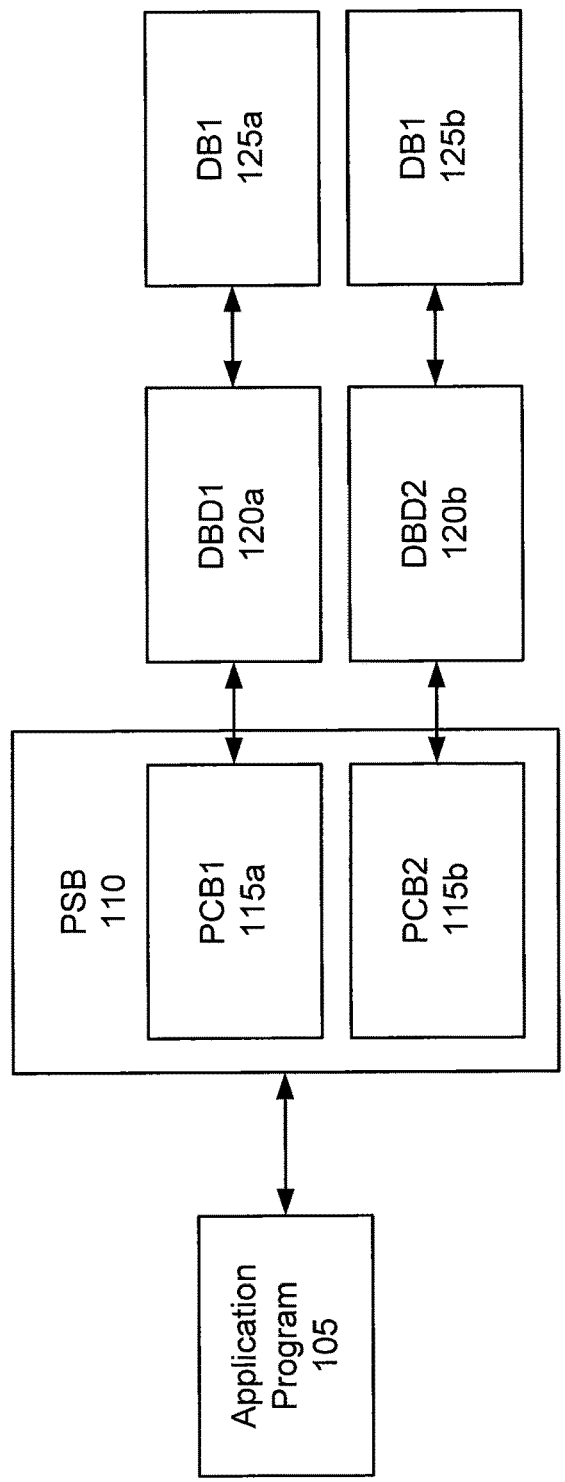
FIG. 1 is a block diagram that illustrates the logical relationship between an application program and an Information Management System (IMS) database.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet files, video files, audio files, picture files, and document exchange files.

Some embodiments of the inventive subject matter stem from a realization that generation of the access control block(s) (ACBs) for an Information Management System (IMS) database can be a time consuming and resource intensive process involving multiple direct-access storage device (DASD) reads of program specification block (PSB) and database definition (DBD) information from a secondary storage device on which the IMS database is implemented. According to some embodiments of the inventive subject matter, a cache management utility on an IMS database server may be used to intercept the operating system service calls that involve a request for information from the secondary storage device containing the IMS database. These calls may include both LOAD supervisor calls and BLDL supervisor calls. When the call involves a LOAD request to obtain DBD information, the cache management utility can check to determine whether the DBD information is already stored in a cache embodied in a primary storage device. If so, the DBD information can be retrieved from the cache. If not, the cache management utility may allow the LOAD supervisor call to execute to perform a DASD read of the secondary storage device to obtain the DBD information. The DBD information obtained from secondary storage can then be stored in the cache in primary storage for retrieval therefrom in response to future LOAD requests for the same DBD information. Similarly, when the call involves a BLDL request to determine whether a DBD exists in a DBD library on the secondary storage device and/or whether an ACB has been created for a particular DBD, i.e., DBD-type ACB on the secondary storage device, the cache management utility can check to determine whether the result of the BLDL request is already stored in the cache memory. If so, the BLDL result can be retrieved from the cache. If not, the cache management utility may allow the BLDL supervisor call to execute to perform the DASD read of the secondary storage device to obtain the BLDL result. The BLDL result obtained from accessing the secondary storage device can then be stored in the cache memory in primary storage for retrieval therefrom in response to future BLDL requests for the same DBD and/or ACB information. The reduction in the number of DASD reads of secondary storage when executing the ACB maintenance utility ACBGEN to generate the ACB(s) for an IMS database through use of the cache in primary storage according to some embodiments of the inventive subject matter can reduce the time to complete the ACB generation process significantly. Depending on how many PSBs reference the same DBD, the time needed to complete the ACBGEN process may be reduced from more than a day to less than an hour.

Figure 2:
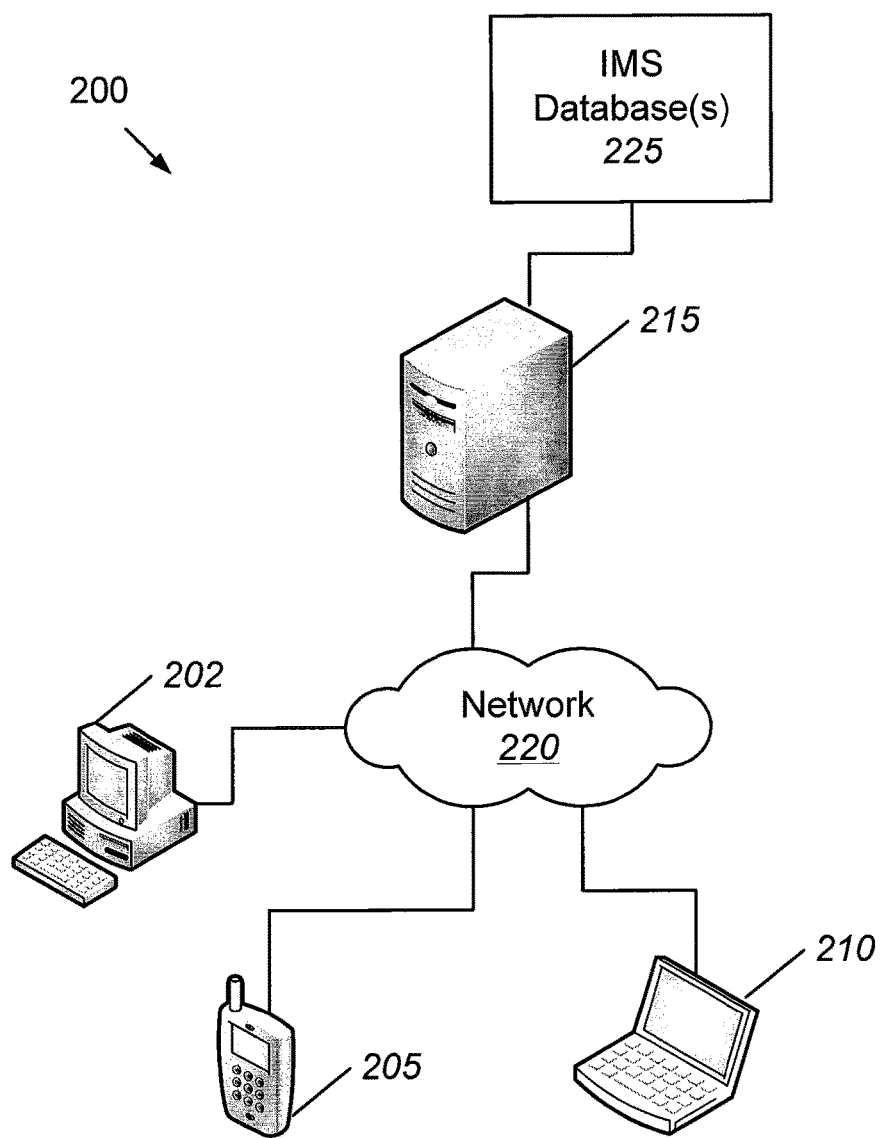
FIG. 2 is a block diagram that illustrates a communication network including an IMS database and server for generating application control blocks (ACBs) using a cache memory in accordance with some embodiments of the inventive subject matter.

Referring to FIG. 2, a communication network including an IMS database and server for generating ACBs using a cache memory, in accordance with some embodiments of the inventive subject matter, comprises end user devices 202, 205, and 210 that are coupled to an IMS database server 215 via a network 220. The network 220 may be a global network, such as the Internet or other publicly accessible network. Various elements of the network 220 may be interconnected by a wide area network, a local area network, an Intranet, and/or other private network, which may not be accessible by the general public. Thus, the communication network 220 may represent a combination of public and private networks or a virtual private network (VPN). The network 220 may be a wireless network, a wireline network, or may be a combination of both wireless and wireline networks. The end user devices 202, 205, 210 may represent wired and/or wireless devices that include one or more applications that access the IMS database(s) 225 via the IMS database server 215. It will be appreciated that in accordance with various embodiments of the inventive subject matter, the IMS database server 215 may be implemented as a single server, separate servers, or a network of servers either co-located in a server farm, for example, or located in different geographic regions.

As shown in FIG. 2, some embodiments according to the inventive subject matter can operate in a logically separated client side/server side-computing environment, sometimes referred to hereinafter as a client/server environment. The client/server environment is a computational architecture that involves a client process (i.e., client devices 202, 205 and 210) requesting service from a server process (i.e., IMS database server 215). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

The clients and servers can communicate using a standard communications mode, such as Hypertext Transport Protocol (HTTP), SOAP, XML-RPC, and/or WSDL. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Although FIG. 2 illustrates an exemplary communication network including an IMS database and server for generating ACBs using a cache memory, it will be understood that embodiments of the inventive subject matter are not limited to such configurations, but are intended to encompass any configuration capable of carrying out the operations described herein.

Figure 3:
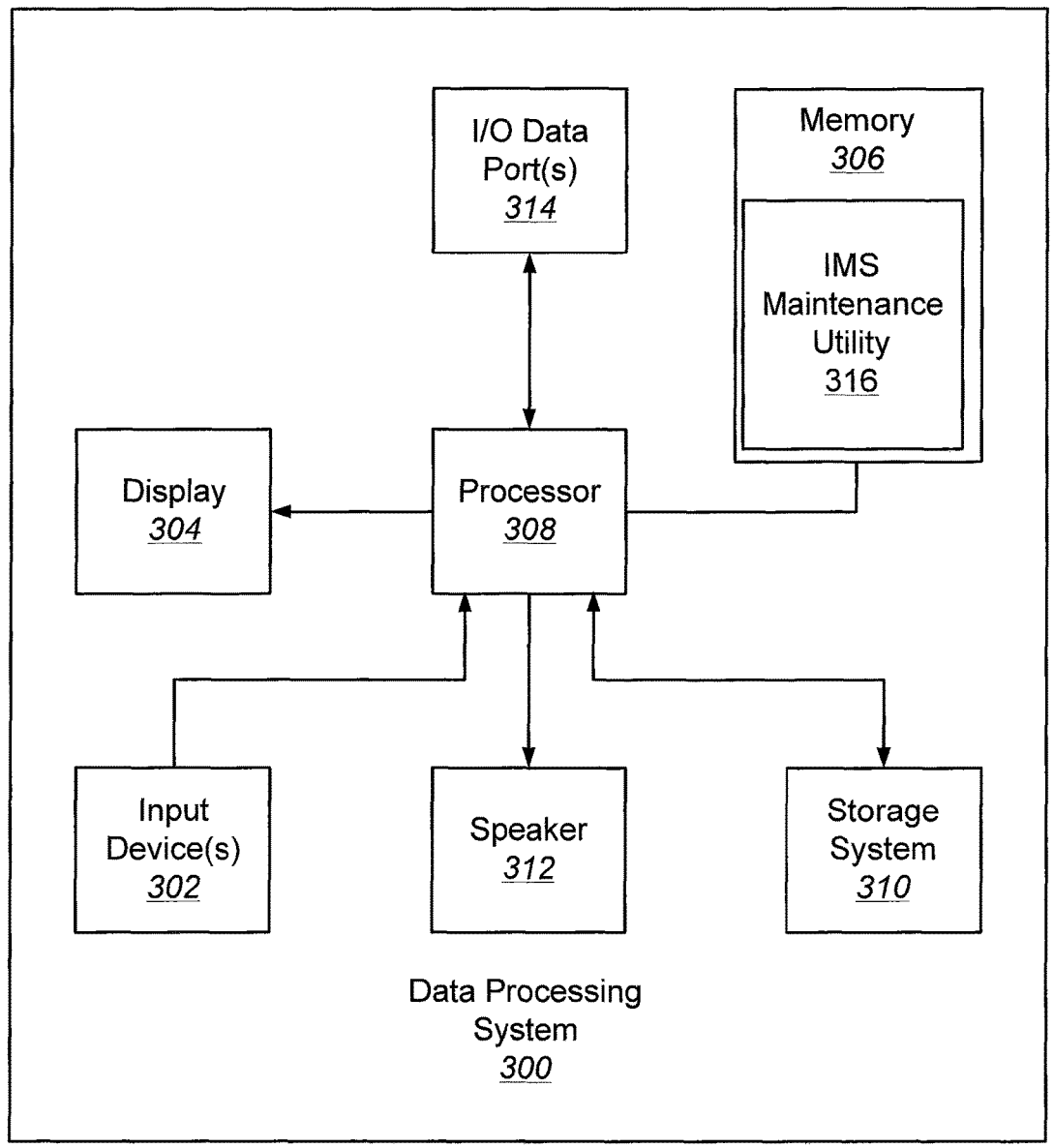
FIG. 3 illustrates a data processing system that may be used to implement the IMS database server of FIG. 2 in accordance with some embodiments of the inventive subject matter.

Referring now to FIG. 3, a data processing system 300 that may be used to implement the IMS database server 215 of FIG. 2, in accordance with some embodiments of the inventive subject matter, comprises input device(s) 302, such as a keyboard or keypad, a display 304, and a memory 306 that communicate with a processor 308. The data processing system 300 may further include a storage system 310, a speaker 312, and an input/output (I/O) data port(s) 314 that also communicate with the processor 308. The storage system 310 may include removable and/or fixed media, such as floppy disks, ZIP drives, hard disks, or the like, as well as virtual storage, such as a RAMDISK. The I/O data port(s) 314 may be used to transfer information between the data processing system 300 and another computer system or a network (e.g., the Internet). These components may be conventional components, such as those used in many conventional computing devices, and their functionality, with respect to conventional operations, is generally known to those skilled in the art. The memory 306 may be configured with an IMS maintenance utility module 316 that may provide functionality that may include, but is not limited to, facilitating the generation of ACBs using a cache memory for an IMS database.

Figure 4:
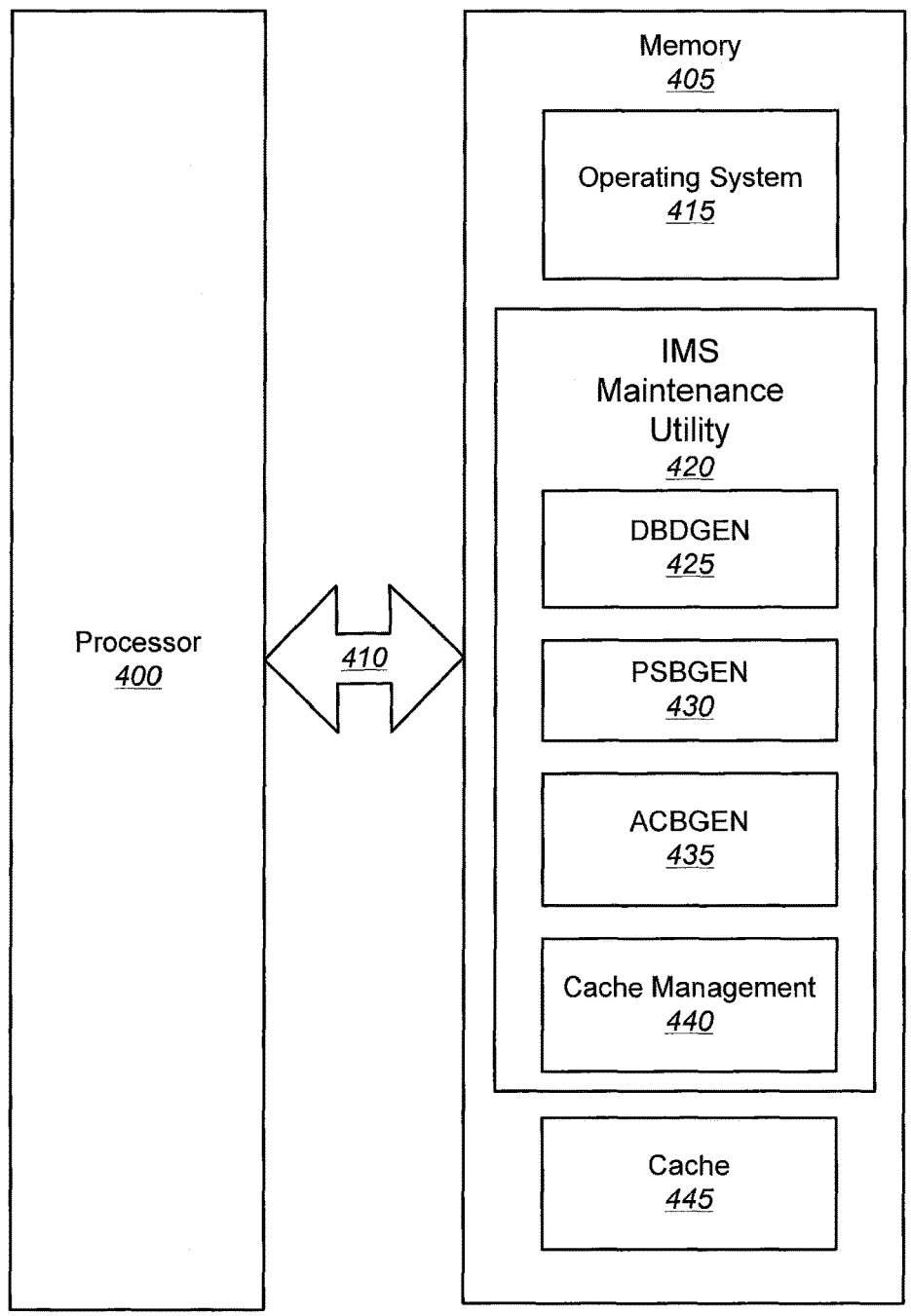
FIG. 4 is a block diagram that illustrates a software/hardware architecture for use in an IMS database server for generating ACBs using a cache memory in accordance with some embodiments of the inventive subject matter.

FIG. 4 illustrates a processor 400 and memory 405 that may be used in embodiments of data processing systems, such as the IMS database server 215 of FIG. 2 and the data processing system 300 of FIG. 3, respectively, for facilitating the generation of ACBs using a cache memory for an IMS database in accordance with some embodiments of the inventive subject matter. The processor 400 communicates with the memory 405 via an address/data bus 410. The processor 400 may be, for example, a commercially available or custom microprocessor. The memory 405 is representative of the one or more memory devices containing the software and data used for facilitating the generation of ACBs using a cache memory for an IMS database in accordance with some embodiments of the inventive subject matter. The memory 405 may include, but is not limited to, the following types of devices: cache, ROM, PROM, EPROM, EEPROM, flash, SRAM, and DRAM.

As shown in FIG. 4, the memory 405 may contain two or more categories of software and/or data: an operating system 415 and an IMS maintenance utility module 420. In particular, the operating system 415 may manage the data processing system's software and/or hardware resources and may coordinate execution of programs by the processor 400. The IMS maintenance utility module 420 may comprise a DBDGEN module 425, a PSBGEN module 430, an ACBGEN module 435, and a cache management module 440. The IMS database administrator may generate DBDs for the IMS database(s) 225 of FIG. 2 by coding a set of assembler macros that are expanded to build the DBDs using the DBDGEN module 425. The generated DBDs are placed in a DBD library (DBDLIB). The IMS database administrator may generate PSBs for the IMS database(s) 225 of FIG. 2 by coding a set of assembler macros that are expanded to build the PSBs using the PSBGEN module 425. The generated PSBs are placed in a PSB library (PSBLIB).

ACBs are created by merging information from PSBs and DBDs. For online applications, ACBs are typically prebuilt using ACBGEN module 435 and stored in an ACB library (ACBLIB). For batch applications, ACBs can be built dynamically using the DBDLIB and the PSBLIB as inputs. ACBs may nevertheless be prebuilt for batch applications because their usage reduces the time required to schedule an application program and they use less storage. The ACBGEN module 435 may also provide some error checking capability. ACBs can be built for all PSBs, particular PSBs, or all PSBs that reference a particular DBD. During ACB generation, the ACBGEN module 435 has exclusive control over the ACBLIB. The ACB maintenance utility can be executed against an inactive copy of the ACBLIB and then the IMS online change function can be used to make the new ACBs available to an active ACBLIB.

The cache management module 440 may be configured to monitor supervisor calls of the operating system 415, such as a z/OS operating system, to determine whether any calls are being made involving a request for information associated with an IMS database system from a secondary storage device. For example, when the ACBGEN module 435 generates the ACBs for the ACBLIB, various LOAD and/or BLDL calls may be generated to read DBD information, determine whether a DBD exists in a DBDLB, and/or determine whether an ACB exists for a particular DBD (i.e., DBD-type ACB) in the ACBLIB. These LOAD and/or BLDL calls may involve a direct-access storage device (DASD) read of the secondary memory, which may be time and processor resource intensive. The impact on time and/or processor resources may be particularly significant where the same information may be read and/or determined multiple times, such as when multiple PSBs reference the same DBD. The cache management module 440 may use a cache memory 445 in primary storage to store DBD information and/or BLDL result information once it is obtained through the LOAD and/or BLDL calls directed to the IMS database in secondary storage. When the ACBGEN module performs an operation that results in a LOAD and/or BLDL operating system supervisor call, the cache management module 440 may check the cache memory 445 to determine whether the requested DBD information and/or BLDL result has been stored therein. If so, the information is retrieved from the cache memory 445 and the supervisor call is not allowed to complete to avoid an unnecessary access of the secondary storage device containing the IMS database. If the requested DBD information and/or BLDL result has not been stored in the cache memory 445, then the supervisor call is allowed to complete to perform the DASD read of the secondary memory containing the IMS database to obtain the information. The obtained information is then stored in the cache memory 445 to avoid future DASD reads of the secondary storage device containing the IMS database system.

Although FIG. 4 illustrates hardware/software architectures that may be used in data processing systems, such as IMS database server 215 of FIG. 2 and the data processing system 300 of FIG. 3, respectively, for facilitating the generation of ACBs using a cache memory for an IMS database in accordance with some embodiments of the inventive subject matter, it will be understood that the present invention is not limited to such a configuration but is intended to encompass any configuration capable of carrying out operations described herein.

Computer program code for carrying out operations of data processing systems discussed above with respect to FIGS. 2-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the IMS database server 215 of FIG. 2, the data processing system 300 of FIG. 3, and the hardware/software architecture of FIG. 4, may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

The data processing apparatus of FIGS. 2-4 may be used to facilitate the generation of ACBs using a cache memory for an IMS database according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 306 coupled to the processor 308 and the memory 405 coupled to the processor 400 include computer readable program code that, when executed by the respective processors, causes the respective processors to perform operations including one or more of the operations described herein with respect to FIGS. 5-7.

Figure 5:
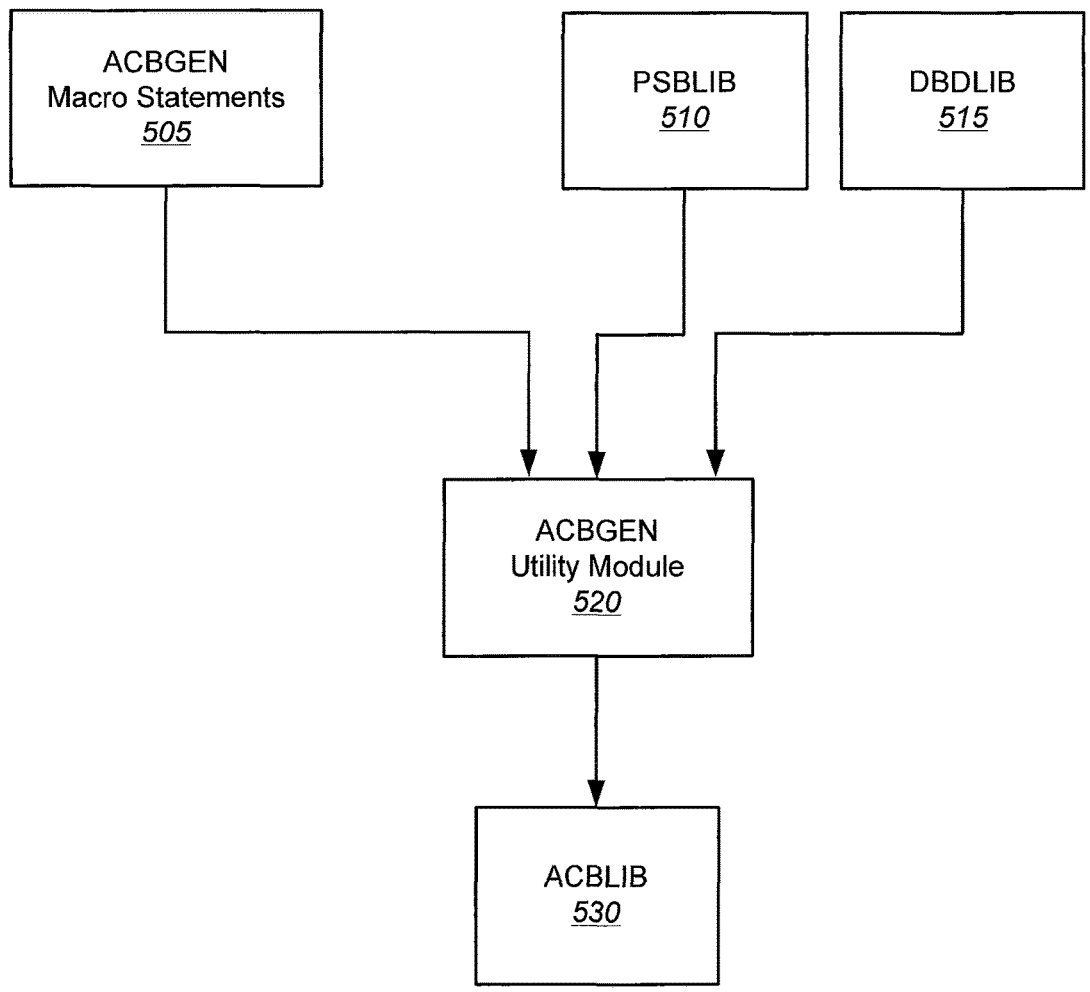
FIG. 5 is a block diagram that illustrates generating ACBs using a cache memory in accordance with some embodiments of the inventive subject matter.

FIG. 5 is a block diagram that illustrates generating ACBs using a cache memory in accordance with some embodiments of the inventive subject matter. As shown in FIG. 5, the ACBGEN utility module 520, which corresponds to the ACBGEN module 435 described above with respect to FIG. 4, uses a set of assembler macros 505 that are generated by the IMS database administrator and identifies which PSBs and/or DBDs to build ACBs for. The ACBGEN utility module 520 accesses PSBs and DBDs from the PSBLIB 510 and DBDLIB 515, respectively, based on the macro statements 505 to generate ACBs therefor. The ACBs are then stored in the ACBLIB 530. As described above, various LOAD and/or BLDL calls may be generated to read DBD information, determine whether a DBD exists in the DBDLB 515, and/or determine whether an ACB exists for a particular DBD (i.e., DBD-type ACB) in the ACBLIB 530. These LOAD and/or BLDL calls may involve a DASD read of the secondary memory, which may be time and processor resource intensive.

Figure 6:
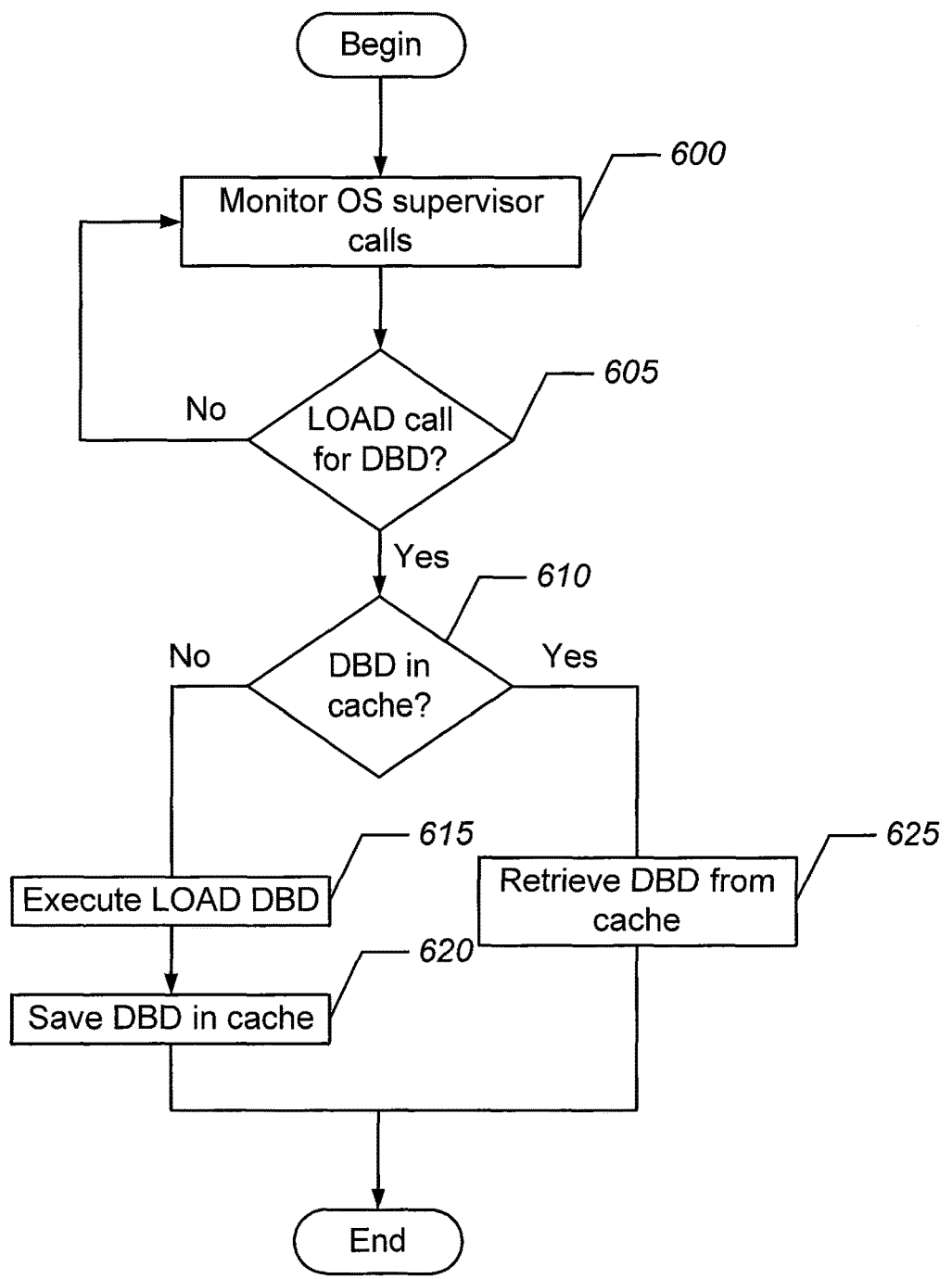
FIGS. 6-7 are flowchart diagrams that illustrate generating ACBs using a cache memory in accordance with some embodiments of the inventive subject matter.
Figure 7:
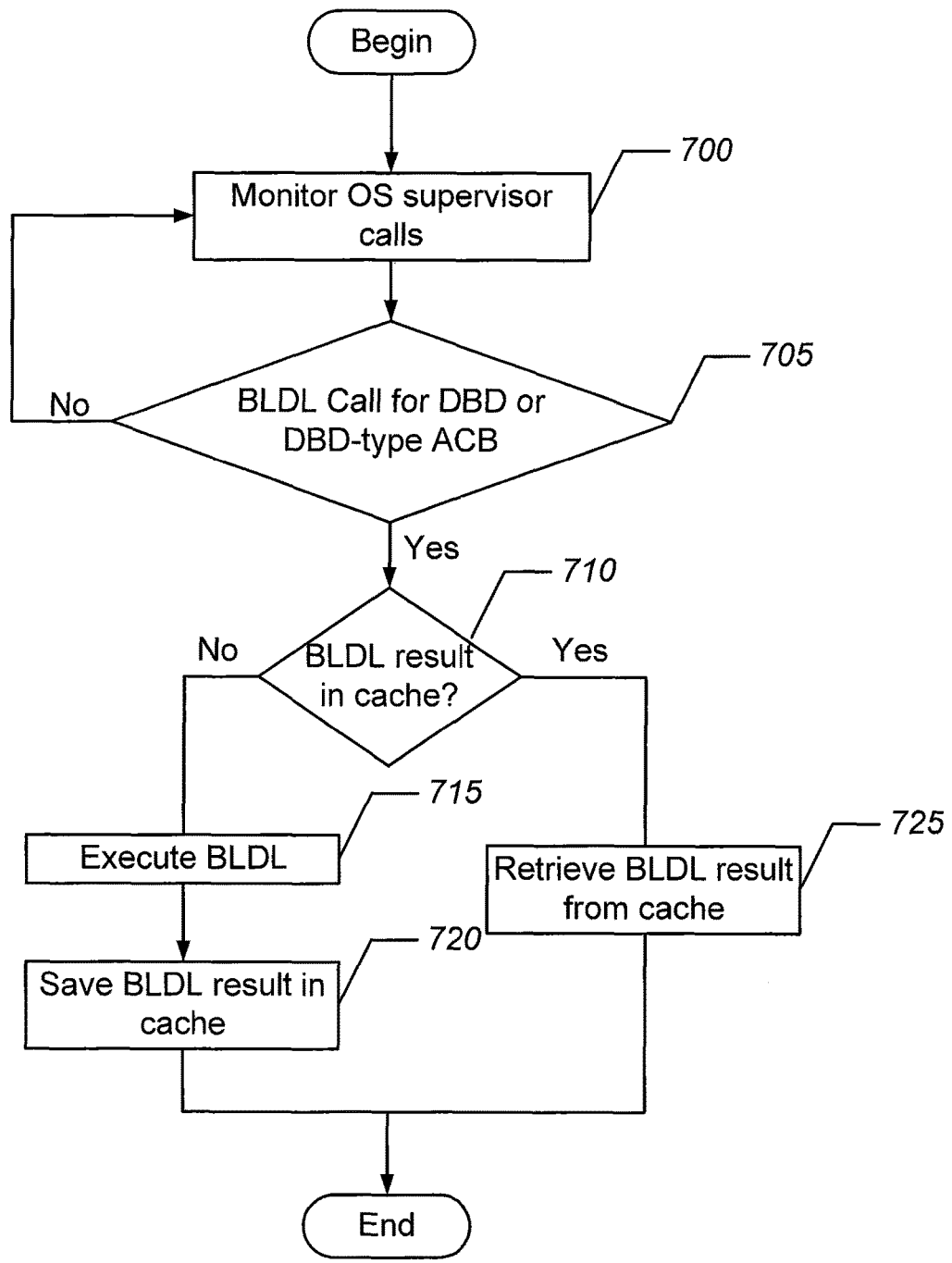

FIGS. 6 and 7 are flowcharts that illustrate operations for generating ACBs using a cache memory in accordance with some embodiments of the inventive subject matter. Referring now to FIG. 6, operations begin at block 600 where the cache management module 440 monitors the supervisor calls of the operating system 415, such as a z/OS operating system, to detect LOAD supervisor calls for DBDs at block 605, which may be generated when running the ACBGEN module 435/520 to create ACBs. When the supervisor call involves a LOAD request to obtain DBD information, the cache management module 440 determines whether the DBD information is already stored in the cache 445 embodied in the primary storage device, i.e., memory 405 at block 610. If so, the DBD information can be retrieved from the cache 445 at block 625. If not, the, the cache management module 440 may allow the LOAD supervisor call to execute at block 615 to perform a DASD read of the secondary storage device to obtain the DBD information. The DBD information may then be saved in the cache 445 at block 620 so that future requests for the same DBD information may be fulfilled from the cache 445 rather than through accessing the DBDLIB on a secondary storage device housing the IMS database system.

Referring now to FIG. 7, operations, according to further embodiments of the inventive subject matter, begin at block 700 where the cache management module 440 monitors the supervisor calls of the operating system 415, such as a z/OS operating system, to detect BLDL supervisor calls for DBDs or DBD-type ACBs at block 705, which may be generated when running the ACBGEN module 435/520 to create ACBs. These BLDL calls may be used to determine whether a DBD exists in the DBDLB 515, and/or determine whether an ACB exists for a particular DBD (i.e., DBD-type ACB) in the ACBLIB 530. When the supervisor call involves a BLDL request to obtain DBD and/or DBD-type ACB result information, the cache management module 440 determines whether the BLDL result information is already stored in the cache 445 embodied in the primary storage device, i.e., memory 405 at block 710. If so, the BLDL result information can be retrieved from the cache 445 at block 725. If not, the, the cache management module 440 may allow the BLDL supervisor call to execute at block 715 to perform a DASD read of the secondary storage device to obtain the BLDL result information. The BLDL result information may then be saved in the cache 445 at block 720 so that future requests for the same BLDL result information may be fulfilled from the cache 445 rather than through accessing the DBDLIB and/or ADBLIB on a secondary storage device housing the IMS database system.

The reduction in the number of DASD reads of secondary storage when executing the ACB maintenance utility ACBGEN to generate the ACB(s) for an IMS database through use of the cache in primary storage, according to some embodiments of the inventive subject matter can reduce the time to complete the ACB generation process. This may be especially true where multiple PSBs reference the same DBD as generation of the ACBs would result in numerous redundant DASD accesses of the DBDLIB and ACBLIB in secondary storage that can be eliminated through use of the cache memory in primary storage according to some embodiments of the inventive subject matter. Moreover, embodiments of the inventive subject matter may be implemented through an interface to an operating system, such as the z/OS operating system, that monitors and intercepts supervisor calls, such as the LOAD and BLDL supervisor calls, without the need to modify or make changes to the operating system itself or the ACB block generation utility. Thus, embodiments of the inventive subject matter can be retrofitted to support existing IMS database management systems and installations.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    performing by a processor of a database server:
        intercepting an operating system supervisor call to a secondary storage device, the operating system supervisor call comprising a request for information from the secondary storage device for information associated with an information Management System (IMS) database being embodied in the secondary storage device;
        determining whether the information that was requested is stored in a cache memory embodied in a primary storage device;
        retrieving the information that was requested responsive to determining that the information that was requested is stored in the cache memory;
        executing the operating system supervisor call to perform a read of the secondary storage device to obtain the information that was requested responsive to determining that the information that was requested is not stored in the cache memory;
        storing the information that was requested in the cache memory responsive to executing the operating system supervisor call to obtain the information that was requested, wherein the information that was requested comprises IMS Database Definition (DBD) information stored in an IMS DBD library on the secondary storage device; and
        generating an IMS Access Control Block (ACB) by merging the IMS DBD information with IMS Program Specific Block (PSB) information.

2. The method of claim 1, wherein the operating system is a z/OS operating system and the supervisor call is a LOAD supervisor call.

3. The method of claim 2, wherein the request for information comprises a request for IMS Database Definition (DBD) information.

4. The method of claim 1, wherein the operating system is a z/OS operating system and the supervisor call is a BLDL supervisor call.

5. The method of claim 4, wherein the request for information comprises a request to determine whether an IMS Database Definition (DBD) exists in a DBD library on the secondary storage device.

6. The method of claim 4, wherein the request for information comprises a request to determine whether an IMS Access Control Block (ACB) for an IMS Database Definition (DBD) exists in an ACB library on the secondary storage device.

7. The method of claim 1, wherein executing the operating system supervisor call to perform the read of the secondary storage device to obtain the information that was requested comprises performing a direct-access storage device (DASD) read of the secondary storage device.

8. A system comprising:
a hardware processor of a database server; and
a memory coupled to the processor and comprising computer readable program code embodied in the memory that is executable by the processor to perform:
intercepting a z/OS operating system LOAD supervisor call to a secondary storage device, the operating system supervisor call comprising a request for information from the secondary storage device for information associated with an information Management System (IMS) database being embodied in the secondary storage device;
determining whether the information that was requested is stored in a cache memory embodied in a primary storage device;
retrieving the information that was requested responsive to determining that the information that was requested is stored in the cache memory;
executing the z/OS operating system LOAD supervisor call to perform a read of the secondary storage device to obtain the information that was requested responsive to determining that the information that was requested is not stored in the cache memory; and
storing the information that was requested in the cache memory responsive to executing the operating system supervisor call to obtain the information that was requested, wherein the information that was requested comprises IMS Database Definition (DBD) information stored in an IMS DBD library on the secondary storage device; and
generating an IMS Access Control Block (ACB) by merging the IMS DBD information with IMS Program Specific Block (PSB) information.

9. The system of claim 8, wherein the request for information comprises a request for IMS Database Definition (DBD) information.

10. The system of claim 8, wherein executing the z/OS operating system LOAD supervisor call to perform the read of the secondary storage device to obtain the information that was requested comprises performing a direct-access storage device (DASD) read of the secondary storage device.

11. A computer program product comprising:
a non-transitory computer readable storage medium comprising computer readable program code embodied in the medium that is executable by a processor of a database server to perform:
intercepting a z/OS operating system BLDL supervisor call, the operating system supervisor call comprising a request for information associated with an information Management System (IMS) database from a secondary storage device, the IMS database being embodied in the secondary storage device;
determining whether the information that was requested is stored in a cache memory embodied in a primary storage device; and
retrieving the information that was requested responsive to determining that the information that was requested is stored in the cache memory;
executing the z/OS operating system BLDL supervisor call to perform a read of the secondary storage device to obtain the information that was requested responsive to determining that the information that was requested is not stored in the cache memory;
storing the information that was requested in the cache memory responsive to executing the operating system supervisor call to obtain the information that was requested, wherein the information that was requested comprises IMS Database Definition (DBD) information stored in an IMS DBD library on the secondary storage device; and
generating an IMS Access Control Block (ACB) by merging the IMS DBD information with IMS Program Specific Block (PSB) information.

* * * * *